(12) United States Patent
Osumi et al.

(10) Patent No.: US 12,716,500 B2
(45) Date of Patent: Aug. 25, 2026

(54) ANNULAR SEAL MATERIAL AND MANUFACTURING METHOD

(71) Applicant: VALQUA, LTD., Tokyo (JP)

(72) Inventors: Naoki Osumi, Gojo (JP); Tomomitsu Mochizuki, Gojo (JP); Miki Otsuka, Gojo (JP)

(73) Assignee: VALQUA, LTD., Tokyo (JP)

( * ) Notice: Subject to any disclaimer, the term of this patent is extended or adjusted under 35 U.S.C. 154(b) by 0 days.

(21) Appl. No.: 18/848,590

(22) PCT Filed: Mar. 17, 2023

(86) PCT No.: PCT/JP2023/010605

§ 371 (c)(1), (2) Date: Sep. 19, 2024

(87) PCT Pub. No.: WO2023/189732

PCT Pub. Date: Oct. 5, 2023

(65) Prior Publication Data

US 2025/0198518 A1 Jun. 19, 2025

(30) Foreign Application Priority Data

Mar. 30, 2022 (JP) ................................. 2022-056238

(51) Int. Cl.
*F16J 15/3284* (2016.01)
*F16J 15/10* (2006.01)
*F16J 15/328* (2016.01)

(52) U.S. Cl.
CPC ......... *F16J 15/3284* (2013.01); *F16J 15/102* (2013.01); *F16J 15/108* (2013.01); *F16J 15/328* (2013.01)

(58) Field of Classification Search
CPC ........ F16J 15/102; F16J 15/108; F16J 15/328; F16J 15/3284
See application file for complete search history.

(56) References Cited

U.S. PATENT DOCUMENTS 2,961,713 A * 11/1960 Hartley ............... B29C 33/0022 264/161
3,586,566 A * 6/1971 Van Vleet .............. B29C 63/22 277/936
(Continued)

FOREIGN PATENT DOCUMENTS

CN 212717983 U 3/2021
CN 213711845 U 7/2021
(Continued)

OTHER PUBLICATIONS

Machine Translation of JPH1052885 (Year: 2025).*
(Continued)

*Primary Examiner* — Gilbert Y Lee
(74) *Attorney, Agent, or Firm* — WHDA, LLP

(57) ABSTRACT

The present invention relates to an annular seal material comprising a core and an outer layer covering a periphery of the core, wherein in the annular seal material, the outer layer has a parting line on each of an outer diameter side and an inner diameter side, and in the annular seal material, a thickness of the outer layer in at least a part of a portion where the parting line is present is smaller than a thickness of the outer layer in a portion where the parting line is absent. According to the present invention, provided are an annular seal material having a parting line having improved visibility and a method for manufacturing the same.

6 Claims, 5 Drawing Sheets

(56) References Cited

U.S. PATENT DOCUMENTS

| | | | | |
|---|---|---|---|---|
| 6,543,785 | B1 * | 4/2003 | Katayama | F16J 15/104<br>277/654 |
| 2004/0157035 | A1 | 8/2004 | Guizzetti et al. | |
| 2007/0045967 | A1 | 3/2007 | Park | |
| 2010/0044970 | A1 * | 2/2010 | Suzuki | F16J 15/061<br>277/592 |
| 2016/0376411 | A1 * | 12/2016 | Aida | F16J 15/022<br>525/193 |
| 2017/0152332 | A1 * | 6/2017 | Aida | C08F 214/222 |
| 2018/0209543 | A1 * | 7/2018 | Nachtmann | F16J 15/102 |

FOREIGN PATENT DOCUMENTS

| | | | |
|---|---|---|---|
| EP | 2546557 | A1 | 1/2013 |
| EP | 3320238 | B1 | 2/2020 |
| JP | S63-163071 | A | 7/1988 |
| JP | H08-151450 | A | 6/1996 |
| JP | H10-52885 | A | 2/1998 |
| JP | H11-201289 | A | 7/1999 |

OTHER PUBLICATIONS

English translation of International Search Report dated May 16, 2023, issued in counterpart International Application No. PCT/JP2023/010605. (2 pages).

Office Action dated May 7, 2025, issued in counterpart JP Application No. 2022-056238, with English translation. (5 pages).

Office Action dated Feb. 6, 2026, issued in counterpart TW Application No. 112111897, with English translation. (10 pages).

Extended (Supplementary) European Search Report dated Feb. 9, 2026, issued in counterpart EP Application No. 23779748.5. (7 pages).

* cited by examiner

ANNULAR SEAL MATERIAL AND MANUFACTURING METHOD

TECHNICAL FIELD

The present invention relates to an annular seal material, and further also relates to a method for manufacturing the same.

BACKGROUND ART

As a method for manufacturing a seal material such as a gasket or a packing used for various applications, a method involving placing a material in a mold and manufacturing a seal material by hot press molding (Japanese Patent Laying-Open No. 08-151450) is known.

CITATION LIST

Patent Literature

PTL 1: Japanese Patent Laying-Open No. 08-151450

SUMMARY OF INVENTION

Technical Problem

An annular seal material manufactured by hot press molding often has a linear parting line formed on the surface along the seam of the mold. Attachment of the annular seal material to an apparatus or the like may be able to be carried out accurately and easily by visually checking the parting line for twisting, sagging, or the like.

However, the parting line is desirably as small as possible from the viewpoint of ensuring the hermetic closure when the annular seal material is attached to an apparatus or the like, and it may be difficult to visually check the parting line.

An object of the present invention is to provide an annular seal material having a parting line having improved visibility and a method for manufacturing the same.

Solution to Problem

The present invention provides the following annular seal material and method for manufacturing the same.

[1] An annular seal material comprising a core and an outer layer covering a periphery of the core, wherein the annular seal material has a parting line on each of an outer diameter side and an inner diameter side, and in the annular seal material, a thickness of the outer layer in at least a part of a portion where the parting line is present is smaller than a thickness of the outer layer in a portion where the parting line is absent.

[2] The annular seal material according to claim 1, wherein a ratio of the thickness of the outer layer in the portion where the parting line is absent to the thickness thereof in the portion where the parting line is present is 1.05 to 40.

[3] The annular seal material according to [1] or [2], wherein the core comprises a colorant.

[4] The annular seal material according to any one of [1] to [3], wherein the outer layer comprises a crosslinked product of at least one selected from the group consisting of a perfluoroelastomer and a fluororubber, and the core comprises a crosslinked product of at least one selected from the group consisting of a perfluoroelastomer, a fluororubber, silicone rubber, and fluorosilicone rubber.

[5] A method for manufacturing the annular seal material according to any one of [1] to [4], comprising:

a preforming step of providing one or two or more rope-like preforms comprising an uncrosslinked core made of a crosslinkable rubber composition for a core, and an uncrosslinked outer layer, made of a crosslinkable rubber composition for an outer layer, covering a periphery of the uncrosslinked core; and a hot press molding step of contacting two end portions of the rope-like preform with each other and placing the same in a mold to carry out hot press molding.

[6] The method for manufacturing the annular seal material according to [5], wherein the providing the preform comprises carrying out extrusion using the crosslinkable rubber composition for a core and the crosslinkable rubber composition for an outer layer.

Advantageous Effects of Invention

According to the present invention, it is possible to provide an annular seal material having a parting line having improved visibility and a method for manufacturing the same.

DESCRIPTION OF EMBODIMENTS

Figure 1A:
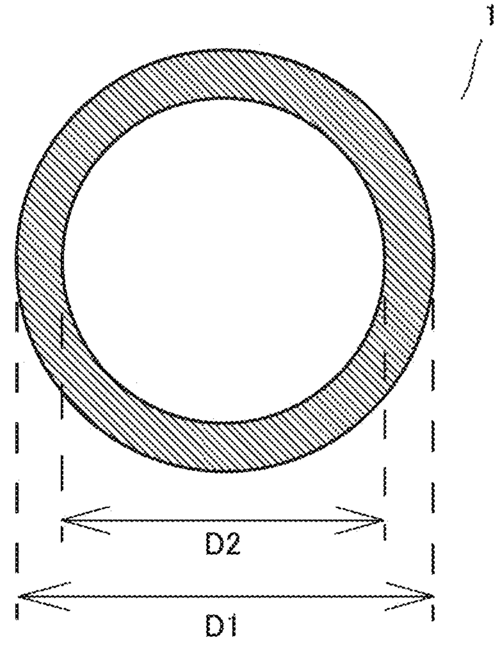
FIGS. 1(*a*) to 1(*c*) are schematic cross-sectional views of an annular seal material.

Hereinafter, embodiments of the present invention will be described with reference to the drawings, but the present invention is not limited to the following embodiments. In all the drawings below, the scale of each constituent is adjusted appropriately to facilitate understanding thereof, and the scale of each constituent shown in the drawings does not necessarily match the scale of the actual constituent.

<Annular Seal Material>

The annular seal material of the present invention includes a core and an outer layer covering a periphery of the core, characterized in that the annular seal material has a parting line on each of an outer diameter side and an inner diameter side, and a thickness of the outer layer in at least a part of a portion where the parting line is present is smaller than a thickness of the outer layer in a portion where the parting line is absent.

Figure 1B:
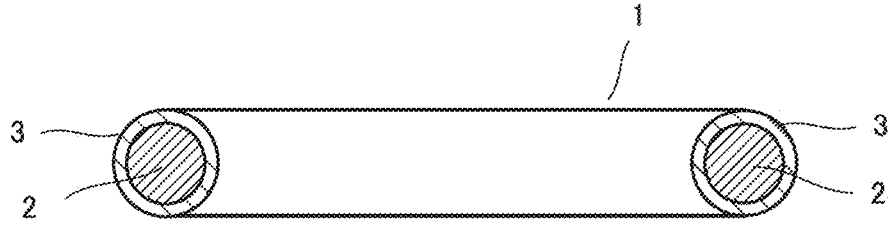
Figure 1C:
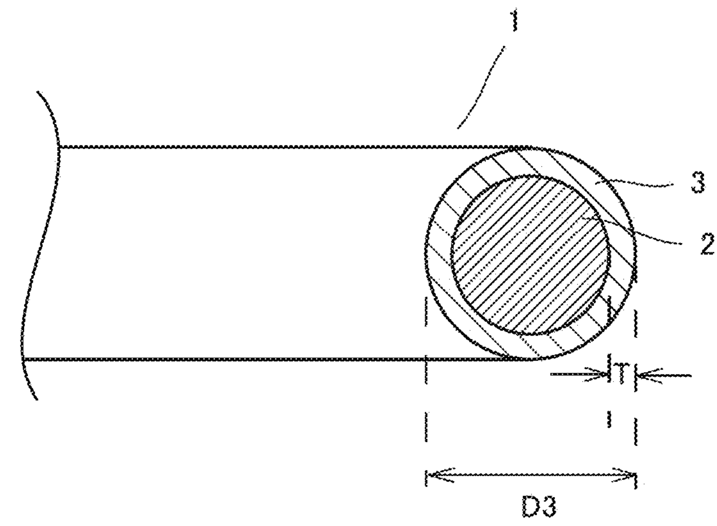

FIG. 1(*a*) shows the shape in a plan view of the annular seal material. In FIG. 1(*a*), an annular seal material 1 is shown by a hatched portion. Annular seal material 1 has an outer diameter D1, which is the diameter of the outer periphery, and an inner diameter D2, which is the diameter of the inner periphery. The outer periphery and the inner periphery are the outer and inner circumferences, respectively, of annular seal material 1 in a plan view. The plan view refers to viewing from the thickness direction of annular seal material 1.

FIGS. 1(*b*) and 1(*c*) are cross-sectional views of annular seal material 1 perpendicular to the plane thereof. An annular seal material 1 includes a core 2 and an outer layer 3 covering the periphery of core 2. As shown in FIG. 1(*a*), annular seal material 1 preferably has a circular cross-sectional shape, and may have a further cross-sectional shape depending on the application. Annular seal material 1 has a cross-sectional diameter D3 and a thickness T of outer layer 3.

Annular seal material 1 has a parting line on each of the outer diameter side and the inner diameter side although not shown in FIGS. 1(*a*) to 1(*c*). The parting line can be a mark of a seam between two molds or a mark resulting from removing a burr, which is generated on the surface of outer layer 3 in the hot press molding step. Annular seal material 1 has a parting line formed along each of the outer periphery and the inner periphery on the surface of outer layer 3.

Figure 2:
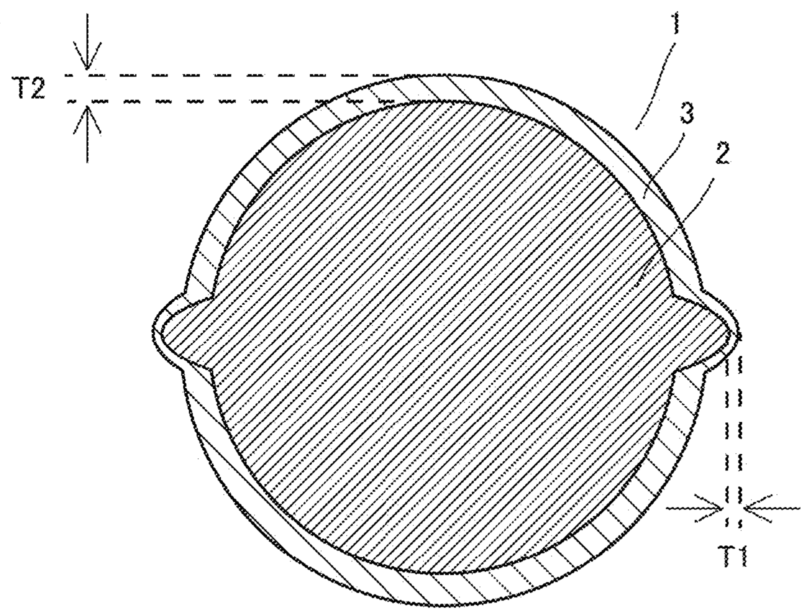
FIG. 2 is a schematic cross-sectional view of an annular seal material.

As shown in FIG. 2, the parting line may be formed in such a way as to be outwardly convex in a cross section of annular seal material 1. In annular seal material 1, a thickness T1 of outer layer 3 in at least a part of a portion where the parting line is present is smaller than a thickness T2 thereof in a portion where the parting line is absent. When thickness T1 of outer layer 3 in at least a part of the portion where the parting line is present is smaller than thickness T2 thereof in the portion where the parting line is absent, core 2 is easily visible through outer layer 3 on the parting line, and thus the visibility of the parting line tends to improve easily. Outer layer 3 of annular seal material 1 may have thickness T1 in a part of the portion where the parting line is present, or may have thickness T1 in the whole of the portion where the parting line is present.

The ratio T2/T1 of thickness T2 of outer layer 3 in the portion where the parting line is absent to thickness T1 thereof in the portion where the parting line is present is 1.05 to 40, and from the viewpoint of core 2 being easily visible through outer layer 3, preferably 1.2 to 20.

From the viewpoint of making core 2 (parting line) further easily visible, core 2 preferably includes a colorant. Outer layer 3 may or may not include a colorant. When outer layer 3 includes a colorant, outer layer 3 preferably includes a colorant different from the colorant included in core 2. Outer layer 3 more preferably does not include a colorant from the viewpoint of the visibility of core 2 (parting line).

In annular seal material 1, preferably the average ratio of thickness T of outer layer 3 to cross-sectional diameter D3 (hereinafter also referred to as the average ratio) may be, for example, $\frac{1}{35}$ or more and $\frac{1}{4}$ or less, and is preferably $\frac{1}{20}$ or more and $\frac{1}{5}$ or less, from the viewpoint of reducing material cost. The average ratio is the average of the ratios measured in cross sections of annular seal material 1 at 5 randomly selected points. The ratio is expressed as, for example, the ratio T/D3 of the maximum thickness T of outer layer 3 to cross-sectional diameter D3 including that thickness in a cross section of annular seal material 1.

Thickness T of outer layer 3 and thickness T2 thereof in the portion where the parting line is absent may be, for example, 0.3 mm or more and 10 mm or less, and is preferably 0.5 mm or more and 3 mm or less. Thickness T1 of outer layer 3 in the portion where the parting line is present may be, for example, 0.1 mm or more and 5 mm or less, and is preferably 0.2 mm or more and 1.5 mm or less.

Cross-sectional diameter D3 of annular seal material 1 may be, for example, 3 mm or more and 50 mm or less, and is preferably 3 mm or more and 15 mm or less.

Core 2 and outer layer 3 can include a crosslinked product of a crosslinkable rubber composition. Hereinafter, the crosslinkable rubber composition forming core 2 will also be referred to as a crosslinkable rubber composition for a core, the crosslinkable rubber composition forming outer layer 3 will also be referred to as a crosslinkable rubber composition for an outer layer, and a crosslinkable rubber composition for a core and a crosslinkable rubber composition for an outer layer are also collectively referred to as a crosslinkable rubber composition.

The crosslinkable rubber composition can include a crosslinkable rubber component. The crosslinkable rubber component can form an elastomer (crosslinked rubber) having a crosslinked structure through a crosslinking reaction. The crosslinkable rubber component can have a crosslinkable site such as a carbon-carbon unsaturated group, a nitrile group, a hydroxyl group, an amino group, a carbonyl group, or a halogen group.

Specific examples of the crosslinkable rubber component include a perfluoroelastomer (FFKM), a fluororubber (FKM), silicone rubber, fluorosilicone rubber, ethylene-propylene rubber (EPM), ethylene-propylene-diene rubber (EPDM), nitrile rubber (NBR; acrylonitrile butadiene rubber), hydrogenated nitrile rubber (HNBR; hydrogenated acrylonitrile butadiene rubber), butyl rubber (IIR), and acrylic rubber. Among these, a perfluoroelastomer, a fluororubber, silicone rubber, and fluorosilicone rubbers are suitably used. In the crosslinkable rubber composition, only one crosslinkable rubber component may be used, or two or more crosslinkable rubber components may be used in combination.

Outer layer 3 includes a crosslinked product of at least one selected from the group consisting of a perfluoroelastomer and a fluororubber, and core 2 includes a crosslinked product of at least one selected from the group consisting of a perfluoroelastomer, a fluororubber, silicone rubber, and fluorosilicone rubber. Therefore, the crosslinkable rubber component in the crosslinkable rubber composition for an outer layer is preferably at least one selected from the group consisting of a perfluoroelastomer and a fluororubber, and more preferably a perfluoroelastomer. The crosslinkable rubber component in the crosslinkable rubber composition for a core is preferably at least one selected from the group consisting of a perfluoroelastomer, a fluororubber, silicone rubber, and fluorosilicone rubber. Outer layer 3 advantageously includes a crosslinked product of a perfluoroelastomer from the viewpoint of radical resistance. Core 2 advantageously includes a crosslinked product of at least one selected from the group consisting of a fluororubber, silicone rubber, and fluorosilicone rubber from the viewpoint of material cost.

The perfluoroelastomer is not particularly limited, and examples thereof include a tetrafluoroethylene (TFE)-perfluoro (alkyl vinyl ether)-based copolymer and a TFE-perfluoro (alkoxyalkyl vinyl ether)-based copolymer. These copolymers may further include a constitutional unit derived from a further perfluoromonomer. According to a perfluoroelastomer composition including a perfluoroelastomer, ozone resistance can be improved more than a crosslinkable rubber composition including a hydrogen atom-containing fluoroelastomer. The crosslinkable rubber composition may include only one perfluoroelastomer, or may include two or more perfluoroelastomers.

The perfluoro(alkyl vinyl ether) forming a tetrafluoroethylene (TFE)-perfluoro(alkyl vinyl ether)-based copolymer can have 1 to 5 carbon atoms in the alkyl group, and for example, can be perfluoro(methyl vinyl ether), perfluoro (ethyl vinyl ether), perfluoro(propyl vinyl ether), or the like. Perfluoro(methyl vinyl ether) is preferable.

The perfluoro(alkoxyalkyl vinyl ether) forming a TFE-perfluoro(alkoxyalkyl vinyl ether)-based copolymer can have 3 to 12 carbon atoms in the group bonded to the vinyl ether group ($CF_2{=}CFO-$), and for example, can be

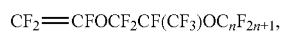

$CF_2{=}CFOCF_2CF(CF_3)OC_nF_{2n+1}$,

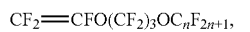

$CF_2{=}CFO(CF_2)_3OC_nF_{2n+1}$,

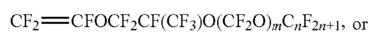

$CF_2{=}CFOCF_2CF(CF_3)O(CF_2O)_mC_nF_{2n+1}$, or

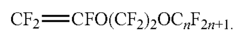

$CF_2{=}CFO(CF_2)_2OC_nF_{2n+1}$.

In the above formulas, n is, for example, 1 to 5, and m is, for example, 1 to 3.

The perfluoroelastomer preferably has crosslinkability, and more specifically, the perfluoroelastomer is preferably one obtained by further copolymerizing a crosslinking site monomer (one further including a constitutional unit derived from a crosslinking site monomer). The crosslinking site means a site capable of a crosslinking reaction. Examples of the crosslinking site include a nitrile group, a halogen group (for example, an I group or a Br group), and a perfluorophenyl group.

One example of a crosslinking site monomer having a nitrile group as a crosslinking site is a nitrile group-containing perfluorovinyl ether. Examples of the nitrile group-containing perfluorovinyl ether include $CF_2{=}CFO(CF_2)_nOCF(CF_3)CN$ (wherein n is, for example, 2 to 4),

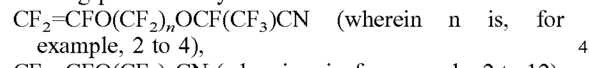

$CF_2{=}CFO(CF_2)_nCN$ (wherein n is, for example, 2 to 12), $CF_2{=}CFO[CF_2CF(CF_3)O]_m(CF_2)_nCN$ (wherein n is, for example, 2, and m is, for example, 1 to 5),

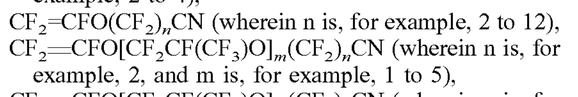

$CF_2{=}CFO[CF_2CF(CF_3)O]_m(CF_2)_nCN$ (wherein n is, for example, 1 to 4, and m is, for example, 1 to 2), and

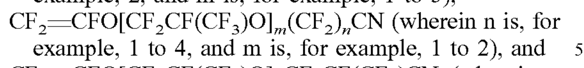

$CF_2{=}CFO[CF_2CF(CF_3)O]_nCF_2CF(CF_3)CN$ (wherein n is, for example, 0 to 4).

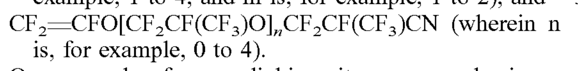

One example of a crosslinking site monomer having a halogen group as a crosslinking site is a halogen group-containing perfluorovinyl ether. Examples of the halogen group-containing perfluorovinyl ether include the above specific examples of the nitrile group-containing perfluorovinyl ether in which the nitrile group is replaced with a halogen group.

The crosslinkable perfluoroelastomer may have a crosslinked structure that crosslinks two main chains.

The ratio by mol of constitutional unit derived from TFE/constitutional unit derived from a perfluoro (alkyl vinyl ether) or a perfluoro (alkoxyalkyl vinyl ether)/constitutional unit derived from a crosslinking site monomer in a perfluoroelastomer is usually 50 to 79.6%/20 to 49.8%/0.2 to 5%, and preferably 60 to 74.8%/25 to 39.5%/0.5 to 2%. The crosslinkable rubber composition can also include two or more perfluoroelastomers having different ratios of the above constitutional units.

Examples of the fluororubber include a binary vinylidene fluoride-based rubber such as a vinylidene fluoride/hexafluoropropylene copolymer, a ternary vinylidene fluoride-based rubber such as a vinylidene fluoride/tetrafluoroethylene/hexafluoropropylene copolymer, a vinylidene fluoride/tetrafluoroethylene/perfluoroalkyl vinyl ether copolymer, or a vinylidene fluoride/tetrafluoroethylene/propylene copolymer, a tetrafluoroethylene/propylene copolymer, an ethylene/tetrafluoroethylene/perfluoromethyl vinyl ether copolymer, a thermoplastic fluororubber, and a liquid fluororubber having a perfluoropolyether skeleton (for example, "SIFEL (registered trademark)" manufactured by Shin-Etsu Chemical Co., Ltd.). Only one fluororubber may be used alone, or two or more fluororubbers may be used in combination.

The fluororubber may contain a functional group. The functional group can be introduced, for example, by copolymerizing a crosslinking site monomer having the functional group. The crosslinking site monomer can be a halogen group-containing monomer.

The crosslinkable rubber composition can optionally include a crosslinking agent depending on the crosslinking system of the crosslinkable rubber component together with a co-crosslinking agent (crosslinking aid). Examples of a crosslinking system of a perfluoroelastomer include a peroxide crosslinking system, a triazine crosslinking system, an oxazole crosslinking system, an imidazole crosslinking system, a thiazole crosslinking system, and a bisphenol crosslinking system. Examples of a crosslinking system of a vinylidene fluoride-based rubber and tetrafluoroethylene-propylene rubber include a peroxide crosslinking system, a polyamine crosslinking system, and a polyol crosslinking system. The crosslinkable rubber composition may be crosslinked with any one crosslinking system, or may be crosslinked with two or more crosslinking systems.

Examples of the peroxide crosslinking agent include 2,5-dimethyl-2,5-di(t-butylperoxy)hexane (examples of a commercially available product: "PERHEXA 25B" and "PERHEXA 25B-40" manufactured by NOF CORPORATION); dicumyl peroxide (example of a commercially available product: "PERCUMYL D" manufactured by NOF CORPORATION); 2,4-dichlorobenzoyl peroxide; di-t-butyl peroxide; t-butyl dicumyl peroxide; benzoyl peroxide (example of a commercially available product: "NYPER B" manufactured by NOF CORPORATION); 2,5-dimethyl-2,5-(t-butylperoxy)hexyne-3 (example of a commercially available product: "PERHEXYNE 25B" manufactured by NOF CORPORATION); 2,5-dimethyl-2,5-di(benzoylperoxy)hexane; α,α'-bis(t-butylperoxy-m-isopropyl)benzene (example of a commercially available product: "PERBUTYL P" manufactured by NOF CORPORATION); t-butylperoxyisopropyl carbonate; and parachlorobenzoyl peroxide. Only one peroxide crosslinking agent may be used, or two or more peroxide crosslinking agents may be used in combination.

Examples of a co-crosslinking agent used in the peroxide crosslinking system include a compound capable of co-crosslinking with a radical (unsaturated polyfunctional compound) such as a triallyl isocyanurate (example of a commercially available product: "TAIC" manufactured by Mitsubishi Chemical Corporation); a triallyl cyanurate; a triallyl formal; a triallyl trimellitate; N,N'-m-phenylene bismaleimide; dipropargyl terephthalate; a diallyl phthalate; or a tetraallyl terephthalamide. Only one co-crosslinking agent may be used, or two or more co-crosslinking agents may be used in combination. Among the above, from the viewpoint of reactivity and heat resistance (compression set properties), the co-crosslinking agent preferably includes a triallyl isocyanurate.

In the triazine crosslinking system, a crosslinking catalyst such as an organotin compound, an onium salt such as a quaternary phosphonium salt or a quaternary ammonium salt, urea, or silicon nitride is used.

Examples of a crosslinking agent used in the oxazole crosslinking system include 2,2-bis(3-amino-4-hydroxyphenyl)hexafluoropropane (BOAP), 4,4'-sulfonylbis(2-aminophenol), and 9,9-bis(3-amino-4-hydroxyphenyl)fluorene. BOAP is preferably used.

As a crosslinking agent used in the imidazole crosslinking system and the thiazole crosslinking system, a conventionally known one can be used. Examples of a crosslinking agent used in the imidazole crosslinking system include 3,3',4,4'-tetraaminobenzophenone and 3,3'-diaminobenzidine.

The content of the crosslinking agent (when two or more are used, the total content thereof) in the crosslinkable rubber composition is, for example, 0.1 to 10 parts by mass, and preferably 0.2 to 5 parts by mass, and more preferably 0.3 to 3 parts by mass, per 100 parts by mass in total of the crosslinkable rubber component.

The content of the co-crosslinking agent (when two or more are used, the total content thereof) in the crosslinkable rubber composition is, for example, 0.5 to 10 parts by mass per 100 parts by mass in total of the crosslinkable rubber component, and from the viewpoint of improving heat resistance, preferably 1 to 8 parts by mass.

For the purpose of improving processability, adjusting a physical property, or the like, the crosslinkable rubber composition can include, as necessary, an additive such as an anti-aging agent, an antioxidant, a vulcanization accelerator, a processing aid (such as stearic acid), a stabilizer, a tackifier, a silane coupling agent, a plasticizer, a flame retardant, a release agent, a wax, or a lubricant. A further example of the additive is a tackiness reducing (preventing) agent such as a fluorine-based oil (for example, a perfluoroether). Only one additive may be used, or two or more additives may be used in combination.

However, for example, when the annular seal material is used in a high-temperature environment, volatilization, elution, or precipitation may occur, and thus the amount of the additive is preferably as small as possible (for example, 10 parts by mass or less, preferably 5 parts by mass or less, more preferably 2 parts by mass or less, and further preferably 1 part by mass or less per 100 parts by mass in total of the crosslinkable rubber component), and it is desirable not to contain any additive.

In addition, the crosslinkable rubber composition can include, as necessary, at least one selected from the group consisting of a colorant and a filler. Only one colorant and filler may each be used, or two or more colorants and fillers may each be used in combination.

Examples of the colorant include at least one selected from the group consisting of an inorganic pigment and an organic pigment. Examples of the inorganic pigment include a white pigment (for example, silica, zinc white, lead white, lithopone, titanium dioxide, precipitated barium sulfate, or a barite powder), a red pigment (for example, red lead or iron oxide red), a yellow pigment (for example, chrome yellow or zinc yellow), a blue pigment (for example, ultramarine blue, Prussian blue, or YInMn blue), and a black pigment (for example, carbon black). Examples of the organic pigment include an azo pigment (an azo lake pigment, an insoluble azo pigment, a condensed azo pigment, or the like); a polycyclic pigment such as an anthraquinone-based pigment, a thioindigo-based pigment, a perinone-based pigment, a perylene-based pigment, a quinacridone-based pigment, an isoindolinone pigment, an isoindoline pigment, a dioxazine pigment, a quinophthalone pigment, or a diketopyrrolopyrrole pigment, and a phthalocyanine-based pigment. As the organic pigment, an organic pigment classified as a pigment in the Color Index can be used. A preferably used pigment is an organic pigment that does not contain a metal element. The organic pigment that does not contain a metal element does not have the risk of scattering a substance derived from a metal element even if a seal material is used in a harsh ozone environment such as in a semiconductor application and the annular seal material is etched.

The content of the colorant (when two or more are used, the total content thereof) in the crosslinkable rubber composition may be, for example, 0.01 parts by mass or more and less than 2 parts by mass, and is preferably 0.05 parts by mass or more and 1.5 parts by mass or less, and more preferably 0.1 parts by mass or more and 1 part by mass or less, per 100 parts by mass in total of the crosslinkable rubber component.

Examples of the filler that can be used include a fluororesin, silica, alumina, zinc oxide, titanium oxide, clay, talc, diatomaceous earth, barium sulfate, calcium carbonate, magnesium carbonate, calcium oxide, mica, graphite, aluminum hydroxide, aluminum silicate, hydrotalcite, a metal powder, a glass powder, and a ceramic powder. Only one filler may be used, or two or more fillers may be used in combination. The content of the filler (when two or more are used, the total content thereof) in the crosslinkable rubber composition is, for example, 0.1 parts by mass or more and 40 parts by mass or less per 100 parts by mass in total of the crosslinkable rubber component, and from the viewpoint of improving mechanical strength, preferably 1 part by mass or more and 30 parts by mass or less, and more preferably more than 1 part by mass and 30 parts by mass or less. Herein, the filler is distinguished from the organic pigment and the inorganic pigment each as a colorant described above, and a type different from the organic pigment and the inorganic pigment can be used.

When the crosslinkable rubber composition includes a fluororesin filler, the ozone resistance and the mechanical strength of the crosslinked product can be further improved. The fluororesin can be contained in the crosslinkable rubber composition, for example, as a fluororesin particle.

The fluororesin used as a filler is a resin having a fluorine atom in the molecule, and examples thereof include polytetrafluoroethylene (PTFE), a tetrafluoroethylene-perfluoroalkyl vinyl ether copolymer (PFA), a tetrafluoroethylene-hexafluoropropylene copolymer (FEP), a tetrafluoroethylene-ethylene copolymer (ETFE), polychlorotrifluoroethylene (PCTFE), a chlorotrifluoroethylene-ethylene copolymer (ECTFE), polyvinylidene fluoride (PVDF), polyvinyl fluoride (PVF), a vinylidene fluoride-hexafluoropropylene copolymer (VDF-HFP copolymer), and a vinylidene fluoride-hexafluoropropylene-tetrafluoroethylene copolymer (VDF-HFP-TFE copolymer). Only one fluororesin may be used alone, or two or more fluororesins may be used in combination.

Among the above, a fluororesin having a relatively high melting point such as PFA or PTFE is preferably used from the viewpoint of preventing the resin from melting in a high-temperature environment to impair a property such as compression set.

The fluororesin used as a filler may contain a functional group. The functional group can be introduced, for example, by copolymerizing a monomer having the functional group. When the crosslinking site monomer is copolymerized as a monomer having a functional group, crosslinking between the fluororesin and the perfluoroelastomer also proceeds with the crosslinking agent, and thus it is possible to further improve the mechanical strength or the like of the crosslinked product of the perfluoroelastomer composition. An example of a fluororesin containing a functional group is a nitrile group-containing polytetrafluoroethylene disclosed in Japanese Patent Laying-Open No. 2013-177631. In addition, the fluororesin can also be a modified fluororesin such as "TFM modified PTFE" (manufactured by Dyneon).

When the crosslinkable rubber composition includes a perfluoroelastomer and a fluororesin filler, it is possible to use a fluororesin-containing perfluoroelastomer manufactured by, for example, 1) a method involving kneading a perfluoroelastomer powder and a fluororesin powder by using a mixing roll, 2) a method involving melt-kneading a perfluoroelastomer powder or pellet and a fluororesin powder or pellet by using an apparatus such as a mixer or a twin-screw extruder, or even 3) a method involving adding a fluororesin at the preparation stage of a perfluoroelastomer.

An example of method 3) above includes a method involving mixing an aqueous dispersion of a perfluoroelastomer and an aqueous dispersion of a fluororesin, each obtained by an emulsion polymerization method, followed by co-coagulation to obtain a mixture of the perfluoroelastomer and the fluororesin.

The crosslinkable rubber composition can be prepared by uniformly kneading a crosslinkable rubber component, a colorant, a crosslinking agent, and a co-crosslinking agent, a filler, and an additive added as necessary. As a kneading machine, a conventionally known kneading machine such as a mixing roll, a pressure kneader, or an internal mixer (Banbury mixer) can be used. The components blended may be mixed and kneaded at the same time, or may be kneaded in a plurality of stages such as first uniformly kneading the components other than a component that contributes to the crosslinking reaction (crosslinking accelerator, crosslinking retarder, crosslinking agent, or the like) among the components blended and then kneading the component that contributes to the crosslinking reaction.

The method for manufacturing annular seal material 1 can include, for example, the following steps.

A preforming step of providing one or two or more rope-like preforms including an uncrosslinked core made of a crosslinkable rubber composition for a core, and an uncrosslinked outer layer, made of a crosslinkable rubber composition for an outer layer, covering a periphery of the uncrosslinked core.

A hot pressing step of contacting two end portions of the rope-like preform with each other and placing the same in a mold to carry out hot press molding.

The descriptions in the annular seal material described above are applied to the crosslinkable rubber composition for a core and the crosslinkable rubber composition for an outer layer.

(Preforming Step)

The preforming step can include carrying out extrusion using a crosslinkable rubber composition for a core and a crosslinkable rubber composition for an outer layer. The rope-like preform can be produced, for example, as follows. First, a crosslinkable rubber composition for a core and a crosslinkable rubber composition for an outer layer are shaped into a sheet by using a roll to produce a sheet-like shaped product. The thickness of the sheet-like shaped product may be, for example, 1 mm or more and 5 mm or less. Next, the sheet-like shaped product is cut into a ribbon-like shaped product having a width of, for example, 5 mm or more and 30 mm or less by using a cutting machine. After that, the ribbon-like shaped products of the crosslinkable rubber composition for a core and the crosslinkable rubber composition for an outer layer are fed into a screw type extruder equipped with a crosshead and extruded into a rope, thereby making it possible to obtain a rope-like preform having a two-layer structure consisting of an outer layer constituted of the crosslinkable rubber composition for an outer layer and a core constituted of the crosslinkable rubber composition for a core. The speed at which the ribbon-like shaped product is extruded into a rope can be, for example, 100 mm/min or more and 1000 mm/min or less.

The cross-sectional diameter of the rope-like preform may be, for example, 3 mm or more and 50 mm or less, and is preferably 3 mm or more and 15 mm or less. The outer layer thickness of the rope-like preform may be, for example, 0.1 mm or more and 10 mm or less, and is preferably 0.2 mm or more and 3 mm or less. The length of the rope-like preform may be, for example, 100 mm or more and 5000 mm or less.

The ribbon-like shaped product can also be produced by feeding the crosslinkable rubber composition for a core and the crosslinkable rubber composition for an outer layer into a plunger type extruder and extruding these into a ribbon, without producing the sheet-like shaped product described above.

The number of rope-like preforms provided may be one or two or more, for example 3 to 10, and can be regulated depending on the inner diameter and/or the outer diameter of the annular seal material.

(Hot Pressing Step)

In the hot pressing step, by press molding the uncrosslinked core and the uncrosslinked outer layer while heating, it is possible to obtain an annular seal material 1 consisting of core 2 and outer layer 3 including a crosslinked product of the crosslinkable rubber composition. The heating temperature in hot press molding may be, for example, about 110° C. or more and 220° C. or less.

An example of a method for making thickness T1 of outer layer 3 in at least a part of the portion where the parting line is present smaller than thickness T2 of the portion where the parting line is absent, in annular seal material 1 is a method involving adjusting the shape of the crosshead die to produce a rope-like preform having a smaller thickness of the outer layer at the 0° and 180° positions in a rope cross section, and placing the rope-like preform in a mold such that the 0° and 180° positions serve as the parting line. Another method is a method involving adjusting the amount of a material fed such that more burrs are generated from the parting line.

In the hot pressing step, the annular seal material may be produced by contacting the two end portions of the rope-like preform with each other to carry out hot pressing by using a mold having an annular cavity, or feed press molding involving first hot press molding the rope-like preform except for the end portions thereof by using a mold having a straight or arcuate cavity to obtain a straight or arcuate shaped body and then hot press molding a joint portion where the two end portions of the straight or arcuate shaped body are in contact with each other to produce an annular seal material may be carried out. The embodiment in which the two end portions are in contact with each other includes a state in which the two end faces of the rope-like preform are in contact with each other. The length in the circumferential direction of the joint portion may be, for example, 100 mm or more and 1200 mm or less. The feed press molding will be described later.

Figure 3:
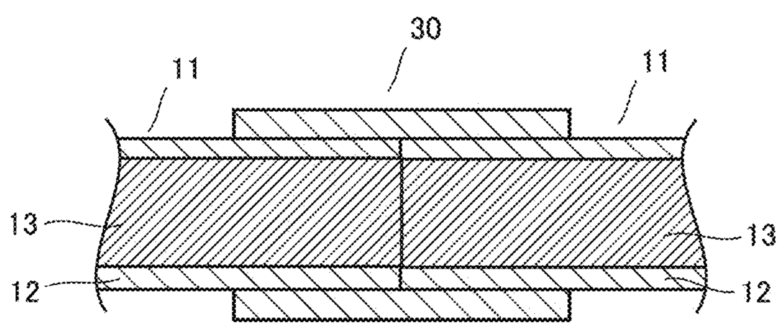
FIG. 3 is a schematic cross-sectional view in the circumferential direction of an annular seal material, illustrating one step of a method for manufacturing an annular seal material.

From the viewpoint of preventing cracking of the outer layer and protrusion of the core from the outer layer in the joint portion where the end portions of the rope-like preform are connected, the hot pressing step can further include winding an uncrosslinked thin film layer 30 around a seam between the two end portions of a rope-like preform 11 that have been contacted (hereinafter also referred to as step a), as shown in FIG. 3, before placed in a mold having an annular cavity or, when feed press molding is carried out, before a second hot pressing step described later (before placed in a mold having a straight or arcuate cavity).

The thickness of uncrosslinked thin film layer 30 may be, for example, 0.05 mm or more and 5 mm or less, and is preferably 0.1 mm or more and 1 mm or less from the viewpoint of reducing the height difference on the outer periphery of rope-like preform 11.

The material constituting uncrosslinked thin film layer 30 may be the crosslinkable rubber composition for an outer layer described above, and is preferably the same kind of the crosslinkable rubber composition for an outer layer as the crosslinkable rubber composition for an outer layer constituting an outer layer 12 of rope-like preform 11.

Uncrosslinked thin film layer 30 can be obtained by shaping the crosslinkable rubber composition for an outer layer into a sheet by using a roll, cutting the sheet into a ribbon-like shaped product having a width of, for example, about 5 mm or more and 100 mm or less by using a cutting machine, and further cutting this according to the length of the ribbon-like shaped product wound around the seam of rope-like preform 11. In addition, the rope-like preform from which the core material has been removed can also be used as uncrosslinked thin film layer 30.

In step a, uncrosslinked thin film layer 30 may be wound around the seam of rope-like preform 11 one turn, or may be wound therearound two or more turns. From the viewpoint of reducing the height difference on the outer periphery of rope-like preform 11, uncrosslinked thin film layer 30 is preferably wound around the seam of rope-like preform 11 one turn to two turns.

Figure 4A:
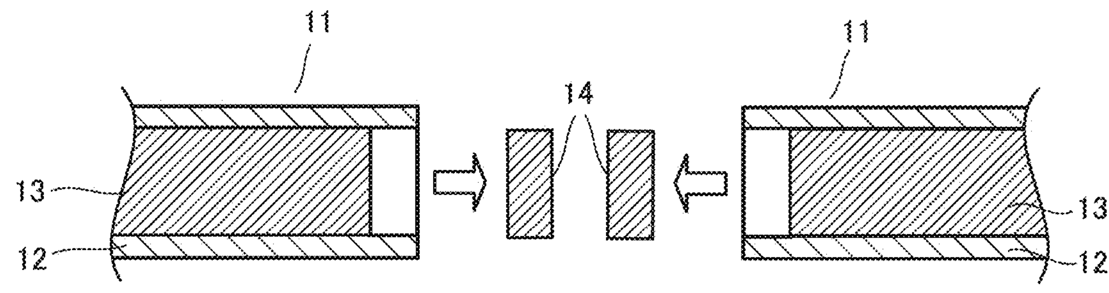
FIGS. 4(*a*) and 4(*b*) are schematic cross-sectional views in the circumferential direction of an annular seal material, illustrating one further step of the method for manufacturing an annular seal material.
Figure 4B:
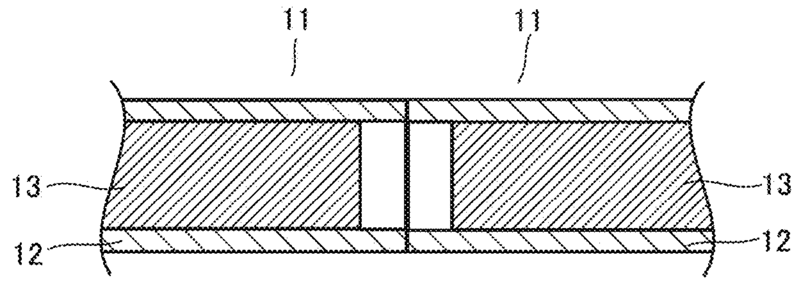

From the viewpoint of preventing protrusion of the core in the joint portion, the method for manufacturing the annular seal material according to the present invention can further include removing an uncrosslinked core 14 from each of the two end portions of rope-like preform 11 (hereinafter also referred to as step b), as shown in FIG. 4(*a*), before the hot pressing step or before a second hot pressing step described later. As shown in FIG. 4(*b*), by contacting the two end portions (outer layer 12) from which the uncrosslinked core has been removed with each other and placing the same in a mold to carry out hot press molding, protrusion of the core in the joint portion can be easily prevented.

Step b may be carried out before the hot pressing step, and when feed press molding is carried out, step b may be carried out before a first hot pressing step described later, or may be carried out between the first hot pressing step and the second hot pressing step.

Uncrosslinked core 14 to be removed can range, for example, from 0.1 mm or more and 20 mm or less inward from the end face. Uncrosslinked core 14 can be removed by using, for example, scissors, a scalpel, or nippers.

From the viewpoint of improving the joinability between the end portions, the method for manufacturing the annular seal material according to the present invention can further include heating the two end portions of the rope-like preform (hereinafter also referred to as step c), before the hot pressing step or, when feed press molding is carried out, before a second hot pressing step described later. By, after step c, contacting the two end portions of the rope-like preform with each other and placing the same in a mold to carry out hot press molding, it is possible to strengthen the joinability between the end portions to prevent protrusion of the core.

Figure 5A:
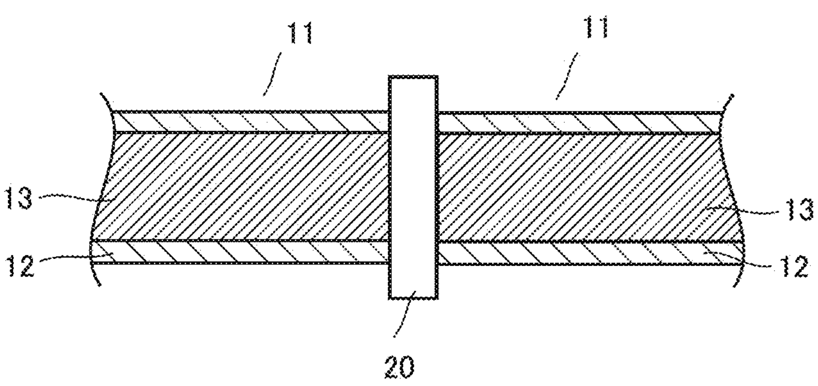
FIGS. 5(*a*) and 5(*b*) are schematic cross-sectional views in the circumferential direction of an annular seal material, illustrating another step of the method for manufacturing an annular seal material.
Figure 5B:
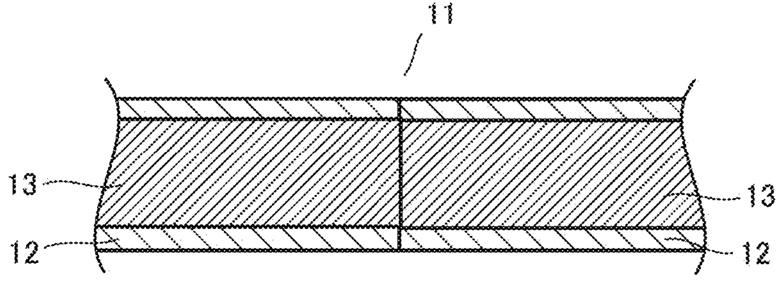

In step c, as shown in FIG. 5(*a*), a heater 20 is sandwiched between the two end portions of rope-like preform 11, and the end faces are heated and melted, and then, as shown in FIG. 5(*b*), the melted end portions can be contacted with each other.

Figure 6:
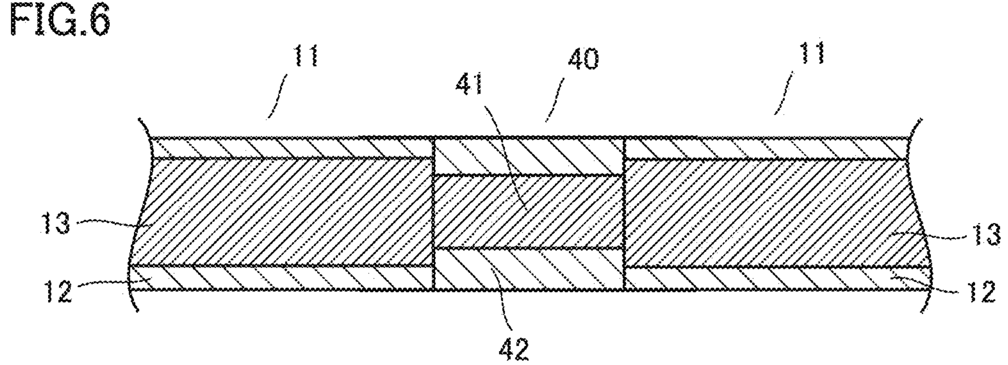
FIG. 6 is a schematic cross-sectional view in the circumferential direction of an annular seal material, illustrating yet another step of the method for manufacturing an annular seal material.

From the viewpoint of preventing protrusion of the core in the joint portion, the method for manufacturing the annular seal material according to the present invention can further include disposing a connecting member 40 between the two end portions of rope-like preform 11 to be placed in a mold and placing the same in the mold (hereinafter also referred to as step d), as shown in FIG. 6, in the hot pressing step or, when feed press molding is carried out, in a second hot pressing step described later.

When an uncrosslinked outer layer 42 of connecting member 40 is thicker than an uncrosslinked outer layer 12 of rope-like preform 11, it is possible to easily prevent protrusion of the core in the joint portion during hot pressing.

The ratio of the thickness of uncrosslinked outer layer 42 of connecting member 40 to the thickness of uncrosslinked outer layer 12 can be, for example, about 1.1 or more and 10 or less. The length in the circumferential direction of connecting member 40 can be, for example, about 5 mm or more and 100 mm or less.

The cross-sectional diameter of connecting member 40 is preferably the same, almost the same, or larger than the cross-sectional diameter of rope-like preform 11 from the viewpoint of reducing the height difference on the outer periphery of the annular seal material.

Connecting member 40 can include an uncrosslinked core 41 made of a crosslinkable rubber composition for a core described later, and uncrosslinked outer layer 42, made of a crosslinkable rubber composition for an outer layer described later, covering the periphery of uncrosslinked core 41. The material constituting uncrosslinked core 41 is preferably the same kind of the crosslinkable rubber composition for a core as the crosslinkable rubber composition for a core that constitutes an uncrosslinked core 13 of rope-like preform 11. The material constituting uncrosslinked outer layer 42 is preferably the same kind of the crosslinkable rubber composition for an outer layer as the crosslinkable rubber composition for an outer layer that constitutes uncrosslinked outer layer 12 of rope-like preform 11.

The method for manufacturing the annular seal material can further include a secondary crosslinking step after the hot pressing step in order to promote crosslinking of an uncrosslinked or insufficiently crosslinked portion. The heating temperature in the secondary crosslinking step may be, for example, about 150° C. or more and 310° C. or less.

(Feed Press Molding)

When feed press molding is carried out in the hot pressing step, the feed press molding can include the following steps.

A first hot pressing step of placing the rope-like preform in a first mold to hot press mold a portion other than the end portions of the rope-like preform.

A second hot pressing step of contacting the two end portions of the rope-like preform with each other and placing the same in a second mold to carry out hot press molding.

In the first hot pressing step, a portion other than the end portions of the rope-like preform can be brought into a crosslinked state. The first mold in which the rope-like preform is placed in the first hot pressing step can have a straight or arcuate cavity. After the rope-like preform is placed in the first mold, the rope-like preform can be pressed while heating by using a C-type press. The temperature of hot press molding in the first hot pressing step may be, for example, about 110° C. or more and 220° C. or less.

Examples of a method for hot press molding a portion other than the end portions of the rope-like preform include a method involving cooling sites corresponding to the end portions of the rope-like preform in the first mold by using a cooling apparatus or the like. The length of the sites to be cooled can be the length in the circumferential direction of the end portions of the rope-like preform to be brought into an uncrosslinked state or an insufficiently crosslinked state, and may be, for example, 1 mm or more and 600 mm or less.

In the second hot pressing step, by contacting the two end portions of the rope-like preform with each other and placing the same in the second mold to carry out hot press molding, the end portions of the rope-like preform can be brought into a crosslinked state and joined. An annular seal material can be obtained by repeatedly joining the end portions of two or more rope-like preforms, or by joining the end portions of one rope-like preform to each other.

The second mold in which the two end portions of the rope-like preform are placed can have a straight and arcuate cavity. The two end portions of the rope-like preform to be placed in the second mold may each have a width in the circumferential direction of, for example, 50 mm or more and 600 mm or less. The two end portions may be both end portions of one rope-like preform, or may be one end portion of each of two rope-like preforms.

The temperature of hot press molding in the second hot pressing step may be, for example, about 110° C. or more and 220° C. or less. The temperature of hot press molding in the second hot pressing step is preferably lower than the temperature of hot press molding in the first hot pressing step, and more preferably 5° C. or more and 20° C. or less lower than the temperature of hot press molding in the first hot pressing step from the viewpoint of preventing cracking and protrusion of the core in the joint portion.

EXAMPLES

Hereinafter, the present invention will be described in more detail with reference to Examples. Unless otherwise specified, "%" and "parts" in examples are % by mass and parts by mass, respectively.

Example 1

A perfluoroelastomer, and 1 part by mass of a crosslinking agent (PERHEXA 25B) and 2 parts by mass of a crosslinking aid (TAIC) per 100 parts by mass of the perfluoroelastomer were blended and kneaded by using a kneader to produce a crosslinkable rubber composition for an outer layer. Next, a fluororubber, and 1 part by mass of a crosslinking agent (PERHEXA 25B), 3 parts by mass of a crosslinking aid (TAIC), and 0.1 parts by mass of a colorant (Cromphtal Violet D5700) per 100 parts by mass of the fluororubber were blended and kneaded by using a kneader to produce a crosslinkable rubber composition for a core. Next, the crosslinkable rubber composition for an outer layer and the crosslinkable rubber composition for a core were each shaped into a sheet by using a roller in such a way as to have a thickness of about 3 mm, and cut into a ribbon having a width of about 15 mm by using a cutting machine. The crosslinkable rubber composition for an outer layer and the crosslinkable rubber composition for a core each shaped into a ribbon were fed into a screw type extruder equipped with a crosshead to produce 5 rope-like preforms having a two-layer structure consisting of an outer layer made of the crosslinkable rubber composition for an outer layer and a core made of the crosslinkable rubber composition for a core. The rope-like preforms each had a cross-sectional diameter of about 7.15 mm, an outer layer thickness of about 1.2 mm, and a length of 800 mm.

Next, each of the 5 rope-like preforms was placed in a first mold of straight type (length of 800 mm, cavity dimension of 7 mm), and the portion other than both end portions was hot press molded by using a C-type press at a temperature of 165° C. while both end portions (width of one end portion of 100 mm) were cooled in such a way as to be brought into an uncrosslinked state.

One end portion of one of the two rope-like preforms after hot press molding was contacted with one end portion of the other, and then the workpiece was placed in the second mold for a joint to hot press mold the joint portion at a temperature of 160° C. The same operation was carried out on the end portions of the remaining rope-like preforms to join the 5 rope-like preforms. After that, secondary crosslinking was carried out at a temperature of 200° C. to obtain an annular seal material.

The obtained annular seal material has a parting line on each of the outer periphery side and the inner periphery side, and the thickness of the outer layer in the portion where the parting line was present was 200 μm, the thickness of the outer layer in the portion where the parting line was absent was 1200 μm, and the ratio of the thickness of the outer layer in the portion where the parting line was absent to the thickness of the outer layer in the portion where the parting line was present was 6/1. In addition, the obtained annular seal material had an outer diameter of 1194 mm and an inner diameter of 1180 mm in a plan view, and a cross-sectional diameter of 7 mm in a cross section. In the annular seal material, the core was visible through the outer layer at the parting line, and thus the parting line was easily visible, and the annular seal material was able to be easily placed in an apparatus without twisting or sagging.

REFERENCE SIGNS LIST

1 Annular seal material; 2 Core; 3 Outer layer; 11 Rope-like preform; 12 Uncrosslinked outer layer; 13 Uncrosslinked core; 14 Uncrosslinked core to be removed; 20 Heater; 30 Uncrosslinked thin film layer; 40 Connecting member; 41 Uncrosslinked core; 42 Uncrosslinked outer layer; T Thickness of outer layer; T1 Thickness of outer layer in portion where parting line is present; T2 Thickness of outer layer in portion where parting line is absent; D1 Outer diameter; D2 Inner diameter; D3 Cross-sectional diameter.

The invention claimed is:

1. An annular seal material comprising a core and an outer layer covering a periphery of the core, wherein the annular seal material has a parting line on each of an outer diameter side and an inner diameter side, the parting line being formed as outwardly convex in a cross-section of the annular seal material, and in the annular seal material, a thickness of the outer layer in at least a part of a portion where the parting line is present is smaller than a thickness of the outer layer in a portion where the parting line is absent, wherein the core is visible through the outer layer on the parting line.

2. The annular seal material according to claim 1, wherein a ratio of the thickness of the outer layer in the portion where the parting line is absent to the thickness thereof in the portion where the parting line is present is 1.05 to 40.

3. The annular seal material according to claim 1, wherein the core comprises a colorant.

4. The annular seal material according to claim 1, wherein the outer layer comprises a crosslinked product of at least one selected from the group consisting of a perfluoroelastomer and a fluororubber, and the core comprises a crosslinked product of at least one selected from the group consisting of a perfluoroelastomer, a fluororubber, silicone rubber, and fluorosilicone rubber.

5. A method for manufacturing the annular seal material according to claim 1, comprising:

a preforming step of providing one or two or more rope-like preforms comprising an uncrosslinked core made of a crosslinkable rubber composition for a core, and an uncrosslinked outer layer, made of a crosslinkable rubber composition for an outer layer, covering a periphery of the uncrosslinked core; and a hot press molding step of contacting two end portions of the rope-like preform with each other and placing the same in a mold to carry out hot press molding.

6. The method for manufacturing the annular seal material according to claim 5, wherein the providing the preform comprises carrying out extrusion using the crosslinkable rubber composition for a core and the crosslinkable rubber composition for an outer layer.

* * * * *